(12) United States Patent
Sheremeta

(10) Patent No.: US 6,601,797 B2
(45) Date of Patent: Aug. 5, 2003

(54) ROTATING COCKPIT DOOR

(76) Inventor: David Sheremeta, 1575 Lake Bonavista Dr. SE, Calgary, Alberta (CA)

( * ) Notice: Subject to any disclaimer, the term of this patent is extended or adjusted under 35 U.S.C. 154(b) by 0 days.

(21) Appl. No.: 10/209,990

(22) Filed: Jul. 31, 2002

(65) Prior Publication Data
US 2002/0175245 A1 Nov. 28, 2002

Related U.S. Application Data
(60) Provisional application No. 60/347,621, filed on Oct. 26, 2001.

(51) Int. Cl.$^7$ .................................................. B64C 1/00
(52) U.S. Cl. .................................................. 244/118.5
(58) Field of Search ........................... 244/129.4, 129.5, 244/118.5, 118.6

(56) References Cited

U.S. PATENT DOCUMENTS

| | | | | |
|---|---|---|---|---|
| 3,658,277 A | * | 4/1972 | Anderson | 244/1 R |
| 3,680,499 A | * | 8/1972 | Boudreau | 109/32 |
| 3,704,845 A | * | 12/1972 | Ord | 244/121 |
| 3,893,259 A | * | 7/1975 | Nineberg | 49/41 |
| 4,060,039 A | * | 11/1977 | Lagarrigue | 109/3 |
| 4,063,519 A | * | 12/1977 | Pretini | 109/8 |
| 4,122,783 A | * | 10/1978 | Pretini | 109/3 |
| 4,385,469 A | * | 5/1983 | Scheuerpflug et al. | 49/41 |
| 4,522,359 A | * | 6/1985 | Church et al. | 244/129.5 |
| 5,201,906 A | * | 4/1993 | Schwarz et al. | 109/8 |
| 6,158,692 A | * | 12/2000 | Abild et al. | 244/129.5 |
| 6,367,198 B1 | * | 4/2002 | Rockenbach | 49/42 |
| 6,474,599 B1 | * | 11/2002 | Stomski | 244/118.5 |

FOREIGN PATENT DOCUMENTS

DE 2901494 A * 4/1980 ........... E05D/15/02

* cited by examiner

Primary Examiner—Charles T. Jordan
Assistant Examiner—Stephen Holzen
(74) Attorney, Agent, or Firm—Gene Scott-Patent Law & Venture Group

(57) ABSTRACT

A security apparatus comprises in combination, an aircraft having a flight deck, a passenger cabin, and a revolving door assembly for moving from one to the other within the aircraft. The door assembly includes a fixed outer cylindrical wall and a movable inner cylindrical wall, the later mounted for rotation within the outer cylindrical wall. The outer wall provides a pair of outer door portals or doorways in opposing positions, one common to the flight deck, the other common to the passenger cabin. The inner wall provides a singular door portal which may be aligned with either one of the pair of outer door portals depending on the rotational position of the inner wall. Locks are positioned on the outer wall to disable rotation of the inner wall in either passage positions as well as a neutral position for detaining a dangerous person within the revolving door assembly.

6 Claims, 1 Drawing Sheet

ROTATING COCKPIT DOOR

RELATED APPLICATIONS

This application claims priority of a prior filed and currently pending U.S. provisional application having serial No. 60/347,621 and file date of Oct. 26, 2001.

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

FIELD OF THE INVENTION

This invention relates generally to security doors and more particularly to a rotating door arrangement for use in a commercial aircraft to prevent direct access to a flight deck from a passenger cabin.

SUMMARY OF THE INVENTION

The present invention teaches certain benefits in construction and use which give rise to the objectives described below.

A security apparatus comprises in combination, an aircraft having a flight deck, a passenger cabin, and a revolving door assembly for moving from one to the other within the aircraft. The door assembly includes a fixed outer cylindrical wall and a movable inner cylindrical wall, the later mounted for rotation within the outer cylindrical wall. The outer wall provides a pair of outer door portals or doorways in opposing positions, one common to the flight deck, the other common to the passenger cabin. The inner wall provides a singular door portal which may be aligned with either one of the pair of outer door portals depending on the rotational position of the inner wall. Locks are positioned on the outer wall in the flight deck to disable rotation of the inner wall in either passage positions as well as a neutral position for detaining a dangerous person within the revolving door assembly.

A primary objective of the present invention is to provide an apparatus and method of use of such apparatus that provides advantages not taught by the prior art.

Another objective is to provide such an invention capable of preventing direct access to an aircraft flight deck from a passenger cabin.

A further objective is to provide such an invention capable of assuring that individual passage from and to an aircraft flight deck is controlled from the flight deck.

A still further objective is to provide such an invention capable of restraining a dangerous individual within an aircraft.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention in at least one of its preferred embodiments, which is further defined in detail in the following description.

Figure 1:
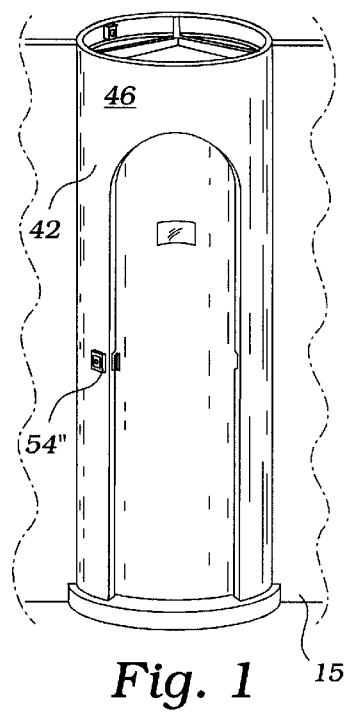
FIG. 1 is an elevational perspective view of the preferred embodiment of the invention as viewed from the cockpit of an aircraft, with inner cylindrical wall rotated such that entry is not possible.
Figure 2:
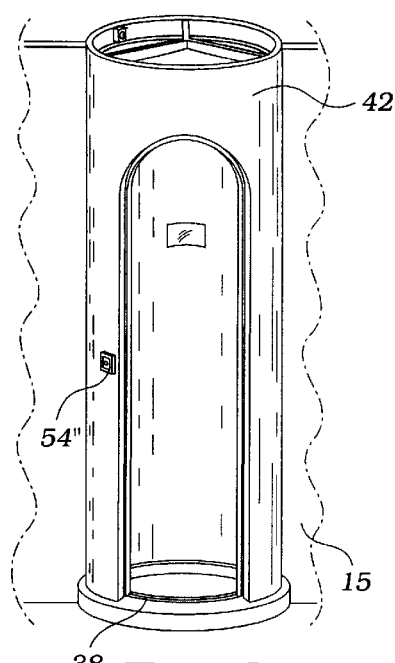
FIG. 2 is the same view thereof with inner cylindrical wall rotated such that entry is possible.
Figure 3:
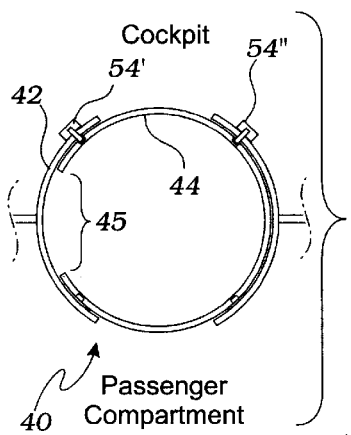
FIGS. 3–5 are schematic plan views thereof with inner cylindrical wall rotated into a neutral position, a passenger cabin entry position and a cockpit entry position respectively.
Figure 4:
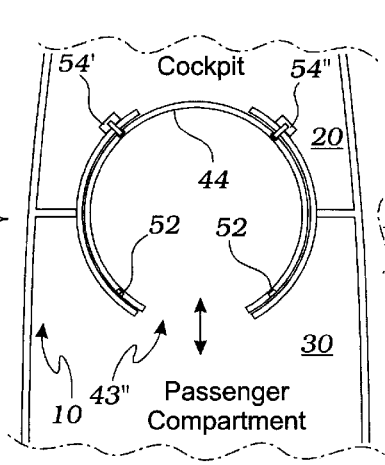
Figure 5:
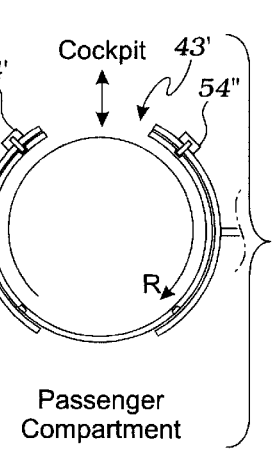

The present invention is a security apparatus comprising, in combination, an aircraft interior structure 10 having a flight deck 20 and a passenger cabin 30. A revolving door assembly 40 is positioned between the flight deck or cockpit 20 and the passenger cabin or compartment 30 and is mounted to a bulkhead 15 that separates the two areas within the aircraft structure 10. The revolving door assembly 40 includes a fixed outer cylindrical wall 42 and a movable inner cylindrical wall 44 mounted for rotation within the outer cylindrical wall 42. These walls are preferably made of steel or other strong metal or a composite material with is not easily damaged by heavy blows or pierced by bullets. The fixed outer cylindrical wall 42 is mounted to the aircraft interior structure 10 and bulkhead 15, and provides a pair of outer door portals 43' and 43" positioned in opposing positions, at 180 angular degrees apart. These portals are large enough for an adult to easily pass through them. One of the outer door portals 43' is positioned so that it is common to the flight deck 20, while the other of the outer door portals 43" is positioned so that it is common to the passenger cabin 30; see FIGS. 4 and 5. The movable inner cylindrical wall 44 is mounted on wheels or bearings, etc., not shown, and is fixed within track 38 for rotation therein. It provides a singular inner door portal 45 enabled by size and the rotational feature for alignment with either of the pair of outer door portals 43', 43" according to, and depending upon rotational positioning of the inner cylindrical wall 44. Once an individual has stepped into the inner cylindrical wall 44, and it is only large enough for one adult individual to fit inside at one time, the individual manually rotates the inner cylindrical wall 44 until the inner door portal 45 is aligned with the one of the outer door portals 43' or 43" depending on the individual's direction of travel. A locking system, otherwise referred to as a means for locking 50 of the inner cylindrical wall 44 at selected positions of rotation, comprises, for example, one or more lock bolts 54', 54" and receivers 52, the lock bolts 54', 54" mounted in the outer cylindrical wall 42 with the receivers 52 being recesses in the outer surface of the inner cylindrical wall 44, and which are positioned, for example, as shown in FIGS. 3–5. Clearly, the locking system may be any type of locking device known in the art and is not limited to that described herein. In use, when the inner door portal 45 is positioned as shown in FIG. 4, passage between the inner cylindrical wall 44 from the passenger compartment 30 is enabled. When the inner cylindrical wall 44 is positioned as shown in FIG. 5, passage between the inner cylindrical wall 44 from the cockpit or flight deck 20 is enabled. It should be understood that foot traffic between the flight deck 20 and the passenger cabin 30 is not directly possible without rotation of the inner cylindrical wall 44 by 180 angular degrees.

The locking means is enabled for operation from only the flight deck 20. As shown in the figures, the locking means is enabled for locking the inner cylinder in position such that the inner cylinder is accessible from the passenger cabin, FIG. 4, from the flight deck, FIG. 5, and from neither, FIG. 3. The lock bolts 54'; 54" may be manually operated, or electrically operated as is well known in the art. It should be noted that the inner cylindrical wall may be locked by lock bolt 54" when the cylinder is accessible from the passenger compartment 30, as shown in FIG. 4. Also, the inner cylindrical wall may be locked by lock bolt 54' when the cylinder is accessible from the cockpit 20, as shown in FIG. 5. Also, the inner cylinder may be locked at a neutral position by either or both of the lock bolts 54', 54" as shown in FIG. 3. In this position, the cylinder may be used as a security isolation device for immobilizing a dangerous person. The lock bolts 54' and 54" are preferably of the type that may be fixed at an open position (withdrawn) to allow rotation of the inner cylinder 44, a locked position, wherein one or both of the lock bolts 54', 54" are engaged with the receivers 52, or a standby position, wherein one or both of the lock bolts will engage with the next receiver 52 that moves into a corresponding position. This provides the important security measure when a dangerous person sets the lock bolt 54" in the open position and enters the inner cylinder 44. Notice that persons in the passenger cabin have no way of locking or unlocking the inner cylinder. The flight deck always is given the choice of allowing the inner cylinder to rotate to the position shown in FIG. 5 whereby an individual can enter the cockpit area 20. Preferably, as shown in FIG. 5, the inner cylinder is able to rotate in either directional sense.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A security apparatus comprising in combination: an aircraft interior structure including a bulkhead separating a flight deck from a passenger cabin; and a revolving door assembly; the revolving door assembly mounted in the bulkhead; the revolving door assembly including a fixed outer cylindrical wail and a rotatable inner cylindrical wall, the inner cylindrical wall rotatably mounted on a means for door rotation within the outer cylindrical wall; the outer cylindrical wall providing a pair of outer door portals in opposing spaced-apart positions; the inner cylindrical wall providing a single inner door portal alignable with each of the pair of outer door portals of the outer cylindrical wall upon rotation of the inner cylindrical wall; the inner cylindrical wall providing four bolt receivers positioned in an outer surface of the inner cylindrical wall, the bolt receivers evenly spaced at 90 angular degree intervals; the outer cylindrical wall providing dual bolts spaced at 90 angular degrees and alignable with any two adjacent of the bolt receivers of the inner cylindrical wall; the dual bolts both positioned in common with the flight deck; the bolts and the bolt receivers positioned for engaging both of the dual bolts into two adjacent of the bolt receivers when the inner door portal is aligned with either one of the outer door portals or with none of the outer door portals.

2. The apparatus of claim 1 wherein the outer and inner cylindrical walls are made of a structural material.

3. The apparatus of claim 1 wherein the outer and inner door portals are of a size for receiving an adult in passing therethrough.

4. The apparatus of claim 1 wherein one of the outer door portals is positioned in common with the flight deck, and the other one of the outer door portals is positioned in common with the passenger cabin.

5. The apparatus of claim 1 wherein the door rotation means is one of wheels and bearings.

6. The apparatus of claim 1 wherein, the inner cylindrical wall is mounted for rotation within a track.

* * * * *